US012532069B2

(12) United States Patent
Jagelski et al.

(10) Patent No.: US 12,532,069 B2
(45) Date of Patent: Jan. 20, 2026

(54) VIDEO LARYNGOSCOPE WIRELESS HUB SYSTEMS AND METHODS

(71) Applicant: Covidien LP, Mansfield, MA (US)

(72) Inventors: Natalie I. Jagelski, Lafayette, CO (US); Alexandra R. Hause, Boulder, CO (US); Peter Douglas Colin Inglis, Boulder, CO (US); Michael Ng, Kowloon (HK); Brittany W. Armstrong, Louisville, CO (US)

(73) Assignee: Covidien LP, Mansfield, MA (US)

( * ) Notice: Subject to any disclaimer, the term of this patent is extended or adjusted under 35 U.S.C. 154(b) by 2 days.

(21) Appl. No.: 18/047,481

(22) Filed: Oct. 18, 2022

(65) Prior Publication Data

US 2023/0124693 A1 Apr. 20, 2023

Related U.S. Application Data

(60) Provisional application No. 63/257,892, filed on Oct. 20, 2021.

(51) Int. Cl.
*H04N 23/661* (2023.01)
*A61B 1/00* (2006.01)
*A61B 1/267* (2006.01)
*H04N 7/18* (2006.01)
*H04N 23/62* (2023.01)
*H04W 76/14* (2018.01)
*H04N 5/77* (2006.01)
*H04N 23/50* (2023.01)

(52) U.S. Cl.
CPC ....... *H04N 23/661* (2023.01); *A61B 1/00016* (2013.01); *A61B 1/267* (2013.01); *H04N 7/183* (2013.01); *H04N 23/62* (2023.01); *H04W 76/14* (2018.02); *H04N 5/77* (2013.01); *H04N 23/555* (2023.01)

(58) Field of Classification Search
None
See application file for complete search history.

(56) References Cited

U.S. PATENT DOCUMENTS

| | | |
|---|---|---|
| 8,194,122 B2 | 6/2012 | Amling et al. |
| 8,652,033 B2 | 2/2014 | Berci et al. |
| 8,715,172 B1 | 5/2014 | Girgis |
| 8,746,239 B2 | 6/2014 | Yoshida |

(Continued)

FOREIGN PATENT DOCUMENTS

| | | |
|---|---|---|
| EP | 2433553 A1 | 3/2012 |
| JP | 2014210085 A | 11/2014 |
| WO | 2020/005890 A1 | 1/2020 |

OTHER PUBLICATIONS

Ambu_aScope_3_Large_Brochure_4963605 (Oct. 2017).

(Continued)

*Primary Examiner* — Daniel T Tekle

(57) ABSTRACT

A video laryngoscope system includes one or more wireless hubs. A wireless hub of the system includes a transmitter that transmits a signal to a video laryngoscope to initiate wireless pairing of the wireless hub and the video laryngoscope. Upon wireless pairing, the video laryngoscope can stream acquired images to the wireless hub operating in a streaming operating mode or can transfer the acquired images to a memory of the wireless hub in a data transfer operating mode.

16 Claims, 14 Drawing Sheets

(56) References Cited

U.S. PATENT DOCUMENTS

| | | |
|---|---|---|
| 8,827,899 B2 | 9/2014 | Farr et al. |
| 8,982,199 B2 | 3/2015 | Amling et al. |
| 9,123,155 B2 | 9/2015 | Cunningham et al. |
| 9,498,112 B1 | 11/2016 | Stewart et al. |
| 9,538,908 B2 | 1/2017 | Allyn et al. |
| 9,687,141 B2 | 6/2017 | McGrath |
| 9,820,641 B2 | 11/2017 | McGrath |
| 10,010,379 B1 | 7/2018 | Gibby et al. |
| 10,149,957 B2 | 12/2018 | Runnels |
| 10,307,599 B2 | 6/2019 | Schilling |
| 2007/0197896 A1 | 8/2007 | Moll et al. |
| 2007/0236514 A1 | 10/2007 | Agusanto et al. |
| 2008/0177146 A1 | 7/2008 | Chen |
| 2008/0177148 A1 | 7/2008 | Chen et al. |
| 2008/0312507 A1 | 12/2008 | Kim |
| 2011/0130632 A1 | 6/2011 | McGrail et al. |
| 2011/0137127 A1 | 6/2011 | Schwartz |
| 2011/0245609 A1 | 10/2011 | Laser |
| 2013/0057667 A1 | 3/2013 | McGrath |
| 2013/0267838 A1* | 10/2013 | Fronk .............. A61B 5/064 600/424 |
| 2014/0031700 A1 | 1/2014 | Ferrantelli |
| 2014/0160261 A1 | 6/2014 | Miller et al. |
| 2014/0275760 A1 | 9/2014 | Lee et al. |
| 2014/0378763 A1 | 12/2014 | Atarot |
| 2015/0140934 A1 | 5/2015 | Abdurrahamn |
| 2015/0305824 A1* | 10/2015 | Yu .............. A61B 90/37 600/424 |
| 2016/0199009 A1 | 7/2016 | Gilboa |
| 2016/0279365 A1 | 9/2016 | Esnouf |
| 2017/0055809 A1 | 3/2017 | Omoto |
| 2017/0105614 A1* | 4/2017 | Mcwilliam .......... A61B 1/267 |
| 2017/0209071 A1 | 7/2017 | Zhao et al. |
| 2017/0258313 A1 | 9/2017 | McGrath |
| 2018/0193102 A1 | 7/2018 | Inoue |
| 2018/0292199 A1 | 10/2018 | Tojo |
| 2018/0296281 A1 | 10/2018 | Yeung et al. |
| 2018/0324352 A1 | 11/2018 | Furuhata |
| 2019/0133430 A1* | 5/2019 | Inglis .............. A61B 1/00052 |
| 2019/0142262 A1* | 5/2019 | Inglis .............. A61B 1/045 600/188 |
| 2019/0200844 A1* | 7/2019 | Shelton, IV ....... G06K 7/10316 |
| 2019/0207857 A1 | 7/2019 | Shelton |
| 2020/0029793 A1 | 1/2020 | McGrath |
| 2020/0195903 A1 | 6/2020 | Komp et al. |
| 2020/0275824 A1 | 9/2020 | Tata |
| 2020/0367742 A1 | 11/2020 | McGrath |
| 2020/0383561 A1 | 12/2020 | McGrath |
| 2021/0052140 A1 | 2/2021 | Tata |
| 2021/0121155 A1 | 4/2021 | Maguire |
| 2021/0127949 A1 | 5/2021 | Tata |
| 2021/0128033 A1 | 5/2021 | Tata |
| 2021/0137350 A1 | 5/2021 | Inglis |
| 2021/0257856 A1 | 8/2021 | Ng |
| 2021/0259536 A1 | 8/2021 | Inglis |
| 2021/0275008 A1 | 9/2021 | McGrath |
| 2021/0318382 A1 | 10/2021 | McGrath |
| 2022/0110504 A1 | 4/2022 | Inglis |
| 2022/0225859 A1 | 7/2022 | Phillips |
| 2022/0257092 A1 | 8/2022 | Ng |
| 2022/0354380 A1 | 11/2022 | Tata |
| 2023/0029630 A1 | 2/2023 | Ng |

OTHER PUBLICATIONS

Mcgrath Mac—Video Laryngoscope Operator's Manual Instructions for Use—Aircraft Medical Ltd (2017) www.aircraftmedical.com—23 pages.

Siena, Francesco Luke, et al.; "The development of a novel steerable bougie to assist in airway management," Australasian Medical Journal, 2016, vol. 9, No. 5, pp. 124-137. http://dx.doi.org/10.4066/AMJ.2016.2619.

Bowers, Nicholas, et al.; "Use of a flexible intubating scope in combination with a channeled video laryngoscope for managing a difficult airway in the emergency department," The Journal of Emergency Medicine, 2016, vol. 52, No. 2, pp. 315-319.http://dx.doi.org/10.1016/j.jermermed.2015.10.010.

Weissbrod, Philip A., et al.; "Reducing injury during video-assisted endotracheal intubation: The "smart stylet" concept," The Laryngoscope, Nov. 2011, vol. 121, pp. 2391-2393.

Rothfield, Kenneth; "The video laryngoscopy market: Past, present, and future," Anesthesiology News Guide to Airway Management, 2014, pp. 29-34.

Lee, Hyung-Chul, "Real-time endoscopic image orientation correction system using an accelerometer and gyrosensor," PLOS ONE | https://doi.org/10.1371/journal.pone.0186691 (Nov. 3, 2017).

International Search Report and Written Opinion for International Application No. PCT/IB2022/060060 mailed Jan. 19, 2023 (17 pages).

\* cited by examiner

VIDEO LARYNGOSCOPE WIRELESS HUB SYSTEMS AND METHODS

CROSS-REFERENCE TO RELATED APPLICATIONS

This application claims the benefit of U.S. Provisional Application No. 63/257,892 filed Oct. 20, 2021, entitled "Video Laryngoscope Wireless Hub Systems and Methods," which is incorporated herein by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Laryngoscopes are in common use during intubation (the insertion of an endotracheal tube into the trachea of a patient). The video laryngoscope is a form of indirect laryngoscopy in which a medical professional (such as a doctor, therapist, nurse, or other practitioner) views a video image of the patient's larynx on a display screen. A video laryngoscope may include an integral display that is in the line-of-sight of the laryngoscope operator so that the patient airway is viewable on the display screen in real-time to facilitate navigation and insertion of tracheal tubes within the airway.

SUMMARY

Certain embodiments are summarized below. These embodiments are not intended to limit the scope of the disclosure. Indeed, the present disclosure may encompass a variety of forms that may be similar to or different from the embodiments set forth below.

In one embodiment, a video laryngoscope system is provided that includes a video laryngoscope and a wireless hub. The video laryngoscope includes a camera that acquires images; an infrared sensor that detects an infrared signal; and a first wireless transceiver that transmits a wireless communication in response to the detected infrared signal. The wireless hub includes an infrared transmitter and a second wireless transceiver. The wireless hub operates to transmit the infrared signal using the infrared transmitter; receive, at the second wireless transceiver, the wireless communication from the first wireless transceiver of the video laryngoscope; and wirelessly pair to the video laryngoscope in response to receiving the wireless communication.

In one embodiment, a video laryngoscope wireless pairing method includes the steps of wirelessly pairing a first wireless hub with a video laryngoscope; while the video laryngoscope is paired with the first wireless hub, wirelessly pairing the video laryngoscope with a second wireless hub; acquiring images at the video laryngoscope during a procedure; detecting a streaming state of the first wireless hub; during the procedure, streaming the acquired images to the first wireless hub to cause the external display to display the streamed acquired images; detecting a data transfer state of the second wireless hub; and subsequently to the procedure, transferring the acquired images to the second wireless hub.

In one embodiment, a video laryngoscope image recording method includes the steps of acquiring an image using a camera of the video laryngoscope; receiving, at a user interface of the video laryngoscope, a first user input to record the acquired image; receiving a second user input to power off the video laryngoscope; without further user input, wirelessly transmitting the recorded image to a wireless hub paired to the video laryngoscope; and subsequently to the transmitting, powering off the video laryngoscope.

In one embodiment, a wireless hub includes a headless housing comprising an external data port; a transmitter carried by the housing; a wireless transceiver, separate from the transmitter, carried by the housing; a processor carried by the housing, wherein the processor is programmed to: receive, via the wireless transceiver, a pairing signal comprising pairing information for a video laryngoscope within range of the transmitter; wirelessly pair to the video laryngoscope in response to receiving the pairing signal; select a first or a second operating mode based on a connection status of the external data port; and receive, via the wireless transceiver, images from the video laryngoscope.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

Figure 1:
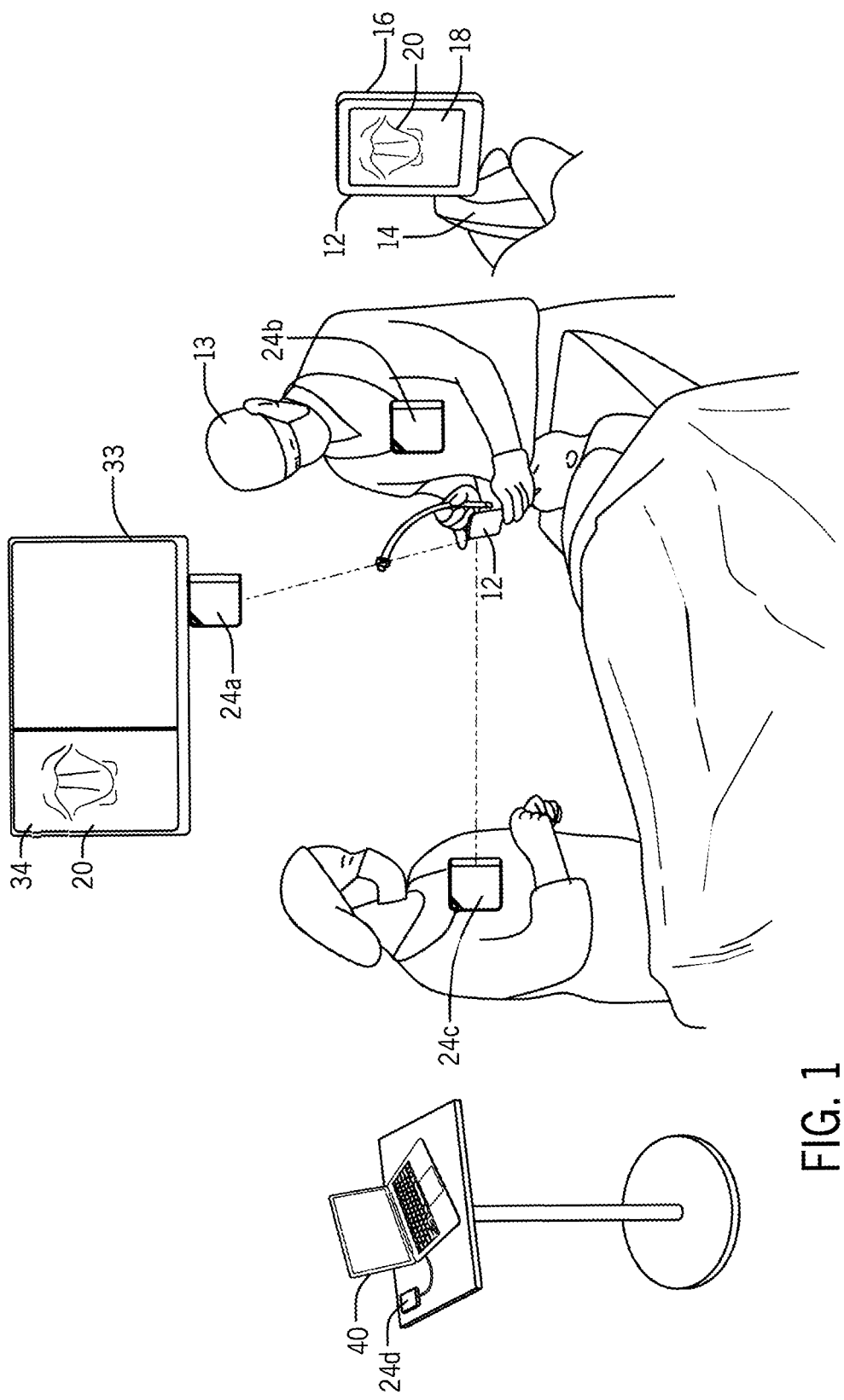
FIG. 1 is a schematic illustration of a patient environment including a video laryngoscope wireless hub system, in accordance with an embodiment of the present disclosure.

A medical professional may use a laryngoscope to view a patient's oral cavity to facilitate insertion of a tracheal tube (e.g., endotracheal tube, tracheostomy tube, or transtracheal tube) through the patient's oral or nasal cavity and into the patient's trachea as part of an intubation procedure. Video laryngoscopes include a camera on a portion of the laryngoscope that is inserted into the patient's oral cavity to obtain an image (e.g., still image and/or moving image, such as a video) of the oral cavity. The image may then be displayed during the intubation procedure to enable the medical professional to visualize the oral cavity and to facilitate manipulation and insertion of the tracheal tube. The images acquired by the video laryngoscope can provide important context to other medical professionals participating in a medical procedure. Accordingly, in some cases, the video laryngoscope can be linked to a relatively larger external display that duplicates the display screen of the video laryngoscope such that other medical professionals can track the progress of the intubation or other airway procedure in real time on the external display.

In some cases, rather than each medical professional having his or her own personal device, video laryngoscopes can be a shared resource, e.g., provided from a hospital or other medical inventory, for use during a medical procedure. After the procedure is complete, the video laryngoscope can be cleaned and returned to the inventory for maintenance and storage until needed again. As a result, over the course of several different medical procedures, a particular video laryngoscope can be used by different medical professional to acquire videos and/or still images during medical procedures of different patients. In addition, the video laryngoscope can include recording capabilities such that images of each individual procedure can be saved directly to a memory of the video laryngoscope. While video laryngoscopes can directly store acquired images, accessing the images from the memory of the video laryngoscope may not be convenient for medical professional wishing to review their past procedures.

Provided herein are video laryngoscope systems and methods that incorporate a wireless hub to facilitate data communication of images acquired using a video laryngoscope. The wireless hub as provided herein is a portable device that can wirelessly pair to a video laryngoscope to 1) wirelessly receive streamed images for display on an external display or 2) wirelessly receive recorded images. In embodiments, the wireless hub is a wireless relay or data relay. The wireless hub can be separate from (e.g., implemented in a separate housing, removable from) paired devices. In embodiments, the wireless hub is a puck, wand, dongle, module, or disc.

Thus, a single wireless hub can facilitate different data communication pathways for video laryngoscope images via activation of different operating modes of the wireless hub. The activation of a particular operating mode can be triggered based on a detected state of the wireless hub so that the data communication happens automatically or with limited user input. In one example, the wireless hub can act as a pass-through device for streaming of images from a paired video laryngoscope when the wireless hub is coupled to an external display. In another example, the wireless hub can automatically receive and store video images from a paired video laryngoscope. Once stored on the wireless hub, the images can be accessed by coupling the wireless hub to a personal computer. Thus, the wireless hub can act as a portable data storage device for video laryngoscope images, e.g., airway images.

Pairing of the video laryngoscope and the wireless hub may also be automatically and securely performed with limited to input by the user of the video laryngoscope. For instance, when the video laryngoscope is powered on, the video laryngoscope may automatically emit an optical signal to indicate its availability to pair with a wireless hub. The wireless hub then communicates, via the optical frequency, data to the video laryngoscope for pairing. Authentication and/or pairing data is then exchanged, via the optical frequency, between the wireless hub and the video laryngoscope to facilitate pairing over a more robust non-optical wireless communication band, such as a WiFi or Bluetooth connection. Once the non-optical wireless communication connection is established between the video laryngoscope and the wireless hub, video data may then be transmitted from the video laryngoscope to the wireless hub via the non-optical wireless communication connection. In other examples, the pairing process may begin with the powering on of the wireless hub.

By using the optical signal to establish the pairing, additional layers of security are provided in the process. For example, because the optical signal needs a line-of-sight (or reflection) between the two devices, there is an added assurance that the video laryngoscope and the wireless hub are within the same room. Further, unlike other pairing methods that require user input (e.g., entering a matching code, etc.), the present pairing method may require no additional user input to complete the pairing, which allows the medical professional to immediately focus on the medical procedure rather than the pairing process.

One or more wireless hubs may be used in conjunction with a video laryngoscope system 10, illustrated in a patient environment in FIG. 1. The patient environment can be any room where an intubation is being performed, such as a medical suite in a hospital or other care setting, an operating or other procedure room, patient recovery room, an emergency intubation setting, or other environments. The video laryngoscope system 10 can include a video laryngoscope 12 that, in operation, is used for airway visualization of a patient. The video laryngoscope system 10 may additionally or alternatively be used with other patient visualization instruments that acquire patient images, e.g., internal patient images.

A laryngoscope operator 13 holds a handle 14 of the laryngoscope coupled to a display portion 16 having a display screen 18. Acquired images 20 are displayed on the display screen 18. The video laryngoscope 12 may be used as part of an intubation procedure to advance a tracheal tube into a patient airway to secure the airway for mechanical ventilation. Accordingly, the operator 13 of the video laryngoscope 12 performs the intubation and directly manipulates the endotracheal tube within the patient's airway, and other clinicians in the patient environment assist the laryngoscope operator, monitor a condition of the patient, prepare or adjust medical equipment in the patient environment, and/or wait until the airway is secured to perform other procedures or interventions. As provided herein, the images 20 can be stored in a memory on the video laryngoscope 12. The images 20 acquired by the video laryngoscope 12 are visible on the laryngoscope display screen 18.

FIG. 1 illustrates arrangements of the system 10 using wireless hubs 24. Notably, each illustrated wireless hub 24 can be a same type of device that is operating differently based on a pairing arrangement of the wireless hub 24 with other devices. The operating mode of the wireless hub 24 can be based on the video laryngoscope 12 detecting or receiving a state of the wireless hub 24, and the video laryngoscope 12 initiating actions consistent with the streaming operating mode or the data transfer operating mode based on the detected state of the wireless hub 24, as generally discussed in more detail with respect to FIG. 5. In an embodiment, the wireless hub 24 operates in only a single mode at one time, but the wireless hub 24 can switch between modes when the state of the wireless hub 24 changes.

In one arrangement, a wireless hub 24a in a streaming operating mode is coupled to an external display 33 and is also wirelessly paired to the video laryngoscope 12. The acquired images 20 from the video laryngoscope 12 are streamed from the video laryngoscope 12 to the wireless hub 24a and provided from the wireless hub 24a to the external display 33 for display on all or a portion of an external display screen 34. Thus, in an embodiment, the images 20 displayed on the laryngoscope display screen 18 and streamed to the external display screen 34 are substantially the same real-time images. In the illustrated embodiment, the wireless hub 24a is directly coupled to an input port of the external display 33. However, other coupling arrangements (e.g., wireless, wired) are also contemplated.

The system 10 can additionally or alternatively include wireless hubs 24b, 24c in a data transfer operating mode that are wirelessly paired to the video laryngoscope 12, are not coupled to the external display 33, and that are operating as personal data storage devices to receive images 20. Thus, the wireless hubs 24b, 24c are paired only to the video laryngoscope 12, and not to any other devices, in the data transfer operating mode. In the illustrated example, the wireless hubs 24b, 24c are worn on lanyards by different medical professionals participating in the medical procedure and who wish to receive the images 20. However, the wireless hubs 24b, 24c can be carried or worn by medical professionals in other arrangements (e.g., clipped to a gown, carried in a pocket). Further, the patient environment may include dedicated locations on a patient bed or other fixtures in the room that can receive wireless hubs 24 operating in the data transfer operating mode. As discussed herein, pairing of the wireless hub 24 to the video laryngoscope 12 includes an optical transmission and detection to initiate wireless pairing. Thus, the wireless hub 24 can be positioned with an uninterrupted optical path to the video laryngoscope 12 during pairing. Once wirelessly paired, the wireless hub 24 can be positioned under sterile gowns or in a sterile pocket or pouch through which wireless signals are able to pass.

In an embodiment, the video laryngoscope 12 can be paired with multiple different wireless hubs 24 simultaneously. The video laryngoscope 12 may operate using rules-based limits on simultaneous pairing to wireless hubs 24. The limits can based on a preset total number of permitted paired wireless hubs 24 for each video laryngoscope 12. In embodiments, an individual video laryngoscope 12 is permitted to pair to no more than ten, no more than five, no more than four, no more than three, or no more than two wireless hubs 24 simultaneously. The limits can also be based on pairing being equal to or less than a preset number of permitted paired wireless hubs 24 in each operating mode. For example, streaming the airway images 20 in real time in the streaming operating mode is more power intensive than a one-time file transfer of the images 20 in the data transfer operating mode. Thus, the system 10 can be configured such that the video laryngoscope 12 is permitted to pair to a lower number of wireless hubs 24 in streaming mode and a relatively higher number of wireless hubs 24 in data transfer operating mode. In embodiments, an individual video laryngoscope is permitted to pair to no more than two or only one wireless hubs 24 in streaming operating mode while also being paired to no more than three wireless hubs 24 in data transfer operating mode simultaneously. Further, it should be understood that the system 10 permits lower numbers of pairings. For example, the video laryngoscope 12 can be paired to only one wireless hub 24 in data transfer operating mode and to no wireless hubs 24 in streaming operating mode or vice versa.

FIG. 1 also illustrates an additional data review operating mode of a wireless hub 24d in which the wireless hub 24d is coupled a computer 40. The computer 40 can be a personal computer, a laptop, a tablet (e.g. a tablet coupled to a portable stand), a multi-parameter patient monitor, a multi-functional medical device or instrument, a networked computer outside of the room, a mobile device, a cloud computing device in communication with a graphical user interface on a device local to an operator, or other device. When the wireless hub 24d is coupled to the computer 40, files containing the images 20 that are stored in a memory of the wireless hub 24d can be viewed and accessed. In the illustrated embodiment, the wireless hub 24 does not contain any integral display, and the computer 40 provides the user interface for interacting with the stored images 20. In the data review operating mode, a medical professional can review videos or still images past medical procedures as part of updating a medical record for a patient. In an embodiment, the wireless hub 24d is not wirelessly paired to any video laryngoscope 12 in the data review operating mode. However, in certain cases, the wireless hub 24d can simultaneously wirelessly pair to the video laryngoscope 12 and also connect to the computer 40 at the same time for a bulk review, access, and/or transfer of files from the video laryngoscope 12 through the wireless hub 24d to the computer 40. In an embodiment, the video laryngoscope 12, when paired to the wireless hub 24d in the data review operating mode, cannot also pair to any other wireless hubs 24 in streaming operating mode, data transfer operating mode, and/or data review operating mode.

Figure 2:
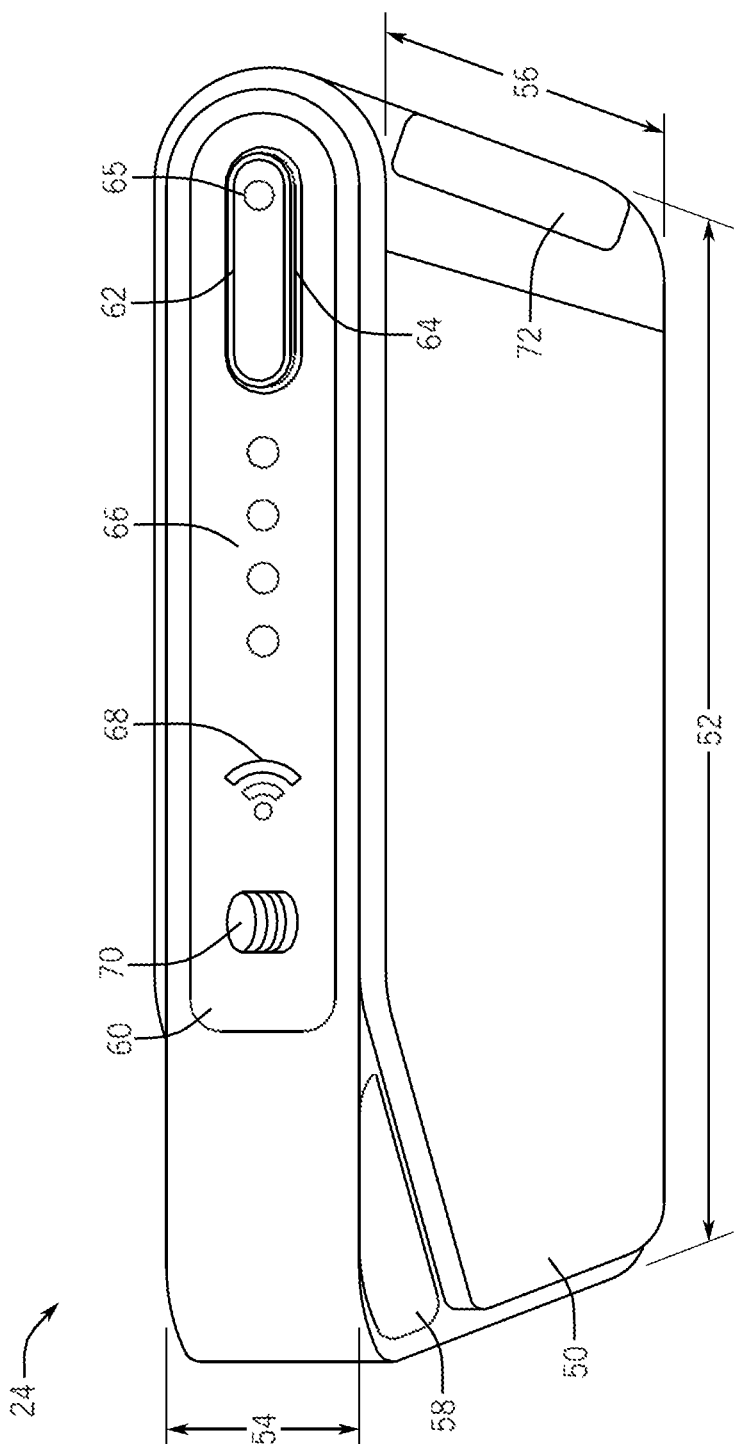
FIG. 2 is a front perspective view of an example wireless hub for use with the system of FIG. 1, in accordance with an embodiment of the present disclosure.

FIG. 2 is a front perspective view of an example wireless hub 24 that can be used with the system 10. The wireless hub 24 can be implemented as a puck, disc, or dongle having a housing 50 that can be sized and shaped to be portable and, in embodiments, handheld or lightweight. By way of non-limiting example, the wireless hub 24 can sized and shaped such that no dimension of the housing is longer than 25 cm or, in an embodiment, such that no dimension of the housing is longer than 6 cm. In an embodiment, a long dimension of the housing 50, e.g., a width dimension 52, a length dimension 56, or a diameter, is less than 15 cm or less than 6 cm. In an embodiment, a depth dimension 54 is less than the width dimension 52 and/or a length dimension 56 such that the housing 50 has a relatively slim profile. In one embodiment, the depth dimension 54 is 2 cm or less. In one embodiment, all wireless hub 24 of the system 10 have a same size and shape as well as functionality such that different wireless hubs 24 can be exchanged with one another. However, it should be understood that a subset of wireless hubs 24 can have a different size and shape to accommodate different memory sizes or different connectivity. The housing 50 can include an integral clip or passage 58 (such as a through-hole, opening, hook, or loop) to retain the housing 50, e.g., on a lanyard, badge, gown, or medical device stand.

The wireless hub 24 has a notification bar 60 that includes a power key or button 62. The power button may include a beveled surface 64 and/or an LED indicator 65 that are illuminated when the wireless hub 24 is powered on. A power reserve indicator 66 can have multiple LED indicators that illuminate based on remaining battery power. In an embodiment, the power reserve indicator 66 includes a low battery warning light (e.g., a red LED). The power reserve indicator 66 can be illuminated by default or in response to a user-initiated battery check. The notification bar 60 includes a wireless connection status indicator 68 that illuminates when the wireless hub 24 is paired to a video laryngoscope 12 (see FIG. 1) and a memory indicator 70 that illuminates when the memory of the wireless hub 24 is full or close to full. The wireless hub 24 includes a transceiver 72, which may be in the form of a transmitter and/or a receiver that may be packaged together or separately. In some examples, the wireless hub 24 may include a transmitter or a receiver. The transceiver 72 may emit a signal, e.g., such as an infrared or other wavelength optical signal, to the video laryngoscope 12 to initiate pairing. The transceiver 72 may also receive optical signals. The transceiver 72 can be carried by, e.g., positioned in or on, the housing 50. In one embodiment, the transceiver 72 is contained within the housing 50, and at least a portion of the housing 50 is transparent to the first signal emitted by the transceiver 72.

In one embodiment, the transceiver 72 is positioned at an edge or corner of the housing 50 to facilitate multidirectional transmission of an initiating first signal for pairing to the video laryngoscope 12. The transceiver 72 may be a first transmitter that sends a first signal to initiate pairing to an available video laryngoscope 12. When the video laryngoscope 12 responds to complete the pairing, the wireless hub 24 can complete the pairing using a separate transmitter or transceiver, e.g. a second transmitter or transceiver, that communicates using a second signal. In one example, the first transmitter, transceiver 72, includes an optical transmitter that sends an optical signal, and the second transmitter is a transmitter of a wireless transceiver that communicates via a non-optical wireless signal. Thus, the first transmitter and the second transmitter, and the first signal and the second signal, may be of different types. In an embodiment, using a first transmitter that transmits and is received via line-of-sight communication facilitates pairing between a co-located wireless hub 24 and the video laryngoscope 12 that are in the same room or environment. Further, line of sight transmission via the transceiver 72 avoids undesired pairing to video laryngoscopes 12 in adjacent rooms. For example, unlike other wireless signals, such as WiFi or Bluetooth signals, optical signals cannot pass through walls. Accordingly, by using an optical signal to initiate pairing, additional security is added that substantially guarantees that the video laryngoscope 12 and any wireless hub 24 to which the video laryngoscope pairs are in the same room. In addition, in medical rooms, such as operating rooms or theaters, many of the surfaces are optically reflective. Thus, a direct line of sight between the video laryngoscope 12 and the wireless hub 24 may not be necessary as the optical signal may reflect off other surfaces already present in the operating room. While the reflections may enable different positions of the wireless hub 24 relative to the video laryngoscope 12, the use of the optical signal still ensures that the video laryngoscope 12 and the wireless hub 24 are in same room.

After line-of-sight pairing is initiated via the transceiver 72, the pairing completion and subsequent communication can be conducted using a more robust communication technique, such as non-optical wireless communication, that does not rely on line-of-sight transmission. Thus, temporary movement of the wireless hub 24 out of line-of-sight will not interrupt communication between the wireless hub 24 and the video laryngoscope 12 after the pairing is initiated.

Figure 3:
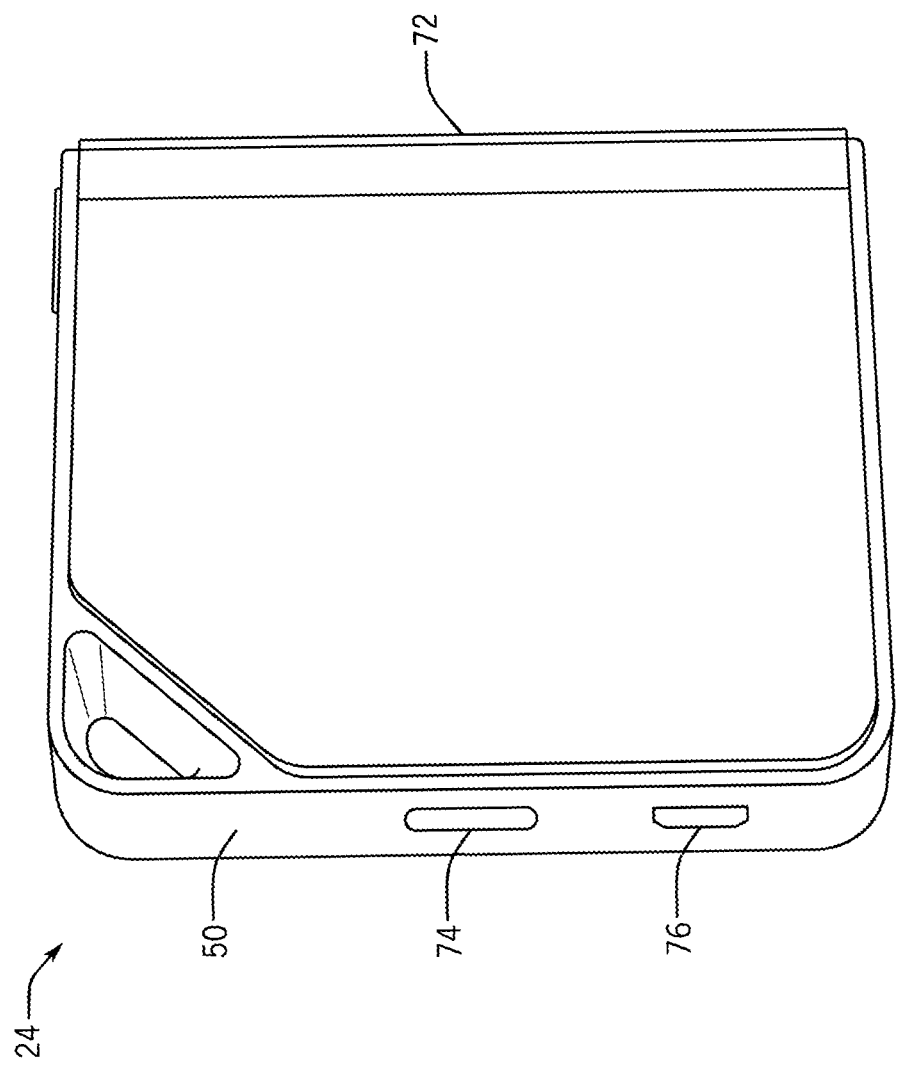
FIG. 3 is a side perspective view of an example wireless hub for use with the system of FIG. 1, in accordance with an embodiment of the present disclosure.

FIG. 3 is a side perspective view of the wireless hub 24 showing one or more connection ports 74, 76 for wired connection to other devices, such as an external display 33 or computer 40 (see FIG. 1) or a charger. The connection port or ports 74, 76 may directly couple to one or more other devices or may receive one end of a removable cable that is connected at a second end to another device. In the illustrated embodiment, the connection ports 74, 76 are positioned opposite from or on a different surface from the transceiver 72 such that connection to other devices does not interrupt an optical pathway of the transceiver 72. However, other arrangements are contemplated depending on a size and configuration of the transceiver 72.

In an embodiment, a first connection port 74 is a USB connection port, e.g., a USB-C connection port and a second connection port 76 is an HDMI connection port, e.g., a micro-HDMI connection port. However, additional or alternative connection types can be provided. The state of the wireless hub 24 may be based on detected connections to other devices at the first connection port 74 and/or the second connection port 76. For example, a first state of the wireless hub 24 may be no connections at the first connection port 74 and the second connection port 76. A second state of the wireless hub 24 may be a connection via the first connection port 74 but not the second connection port 76. A third state of the wireless hub 24 may be a connection via both the first connection port 74 and the second connection port 76. A fourth state may be no connection at the first connection port 74 but a detected connection at the second connection port 76. The state of the wireless hub 24 can be communicated to the video laryngoscope 12 to activate different operating modes of the wireless hub 24 as provided herein.

Figure 4:
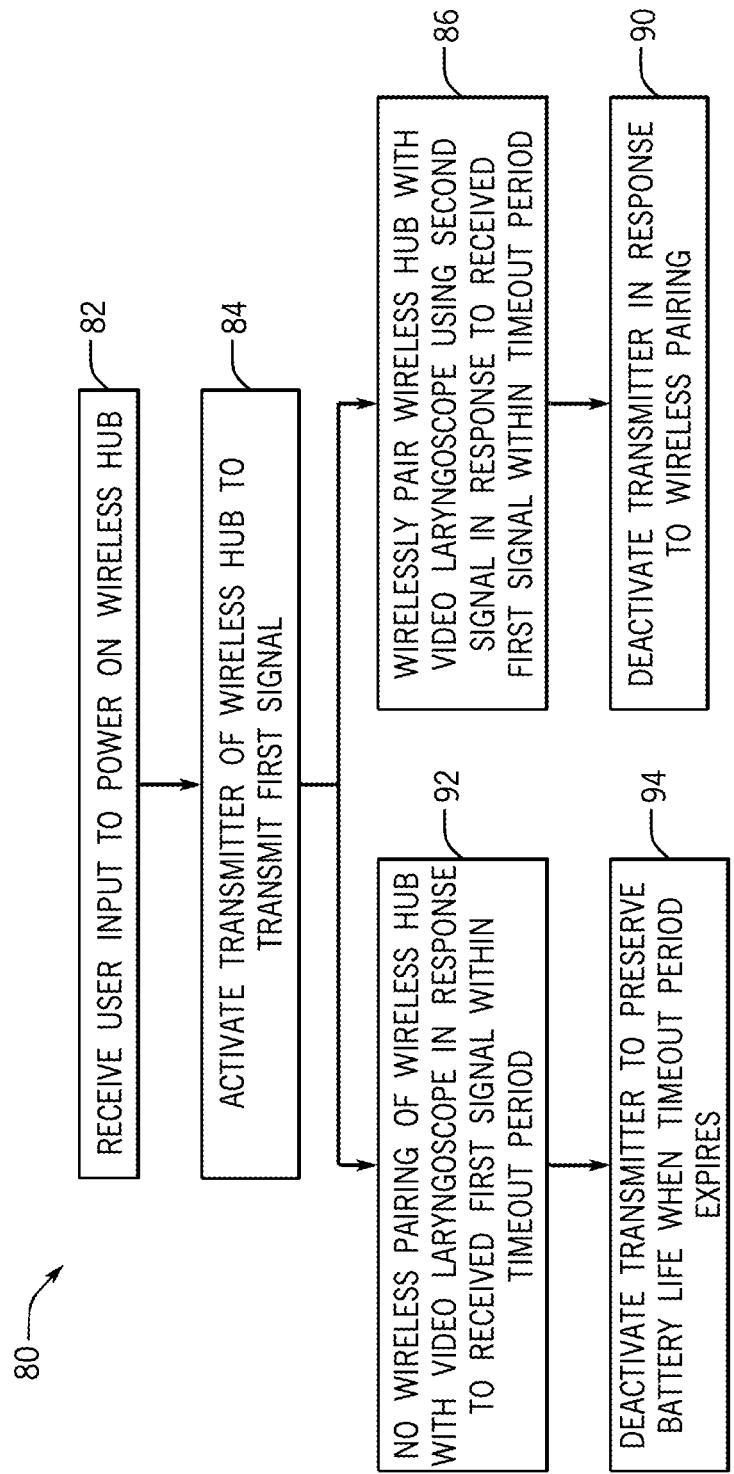
FIG. 4 is a flow diagram of a method of pairing a wireless hub with a video laryngoscope, in accordance with an embodiment of the present disclosure.

FIG. 4 is a process flow diagram of a method 80 of pairing a wireless hub 24 with a video laryngoscope 12 of the system 10 and with reference to features discussed in FIGS. 1-3, in accordance with an embodiment of the present disclosure. All or some of the method 80 may be performed by the wireless hub 24 interacting with the video laryngoscope 12. FIG. 4 generally shows steps of wireless pairing of the wireless hub 24 and the video laryngoscope 12 or steps of failure to pair the wireless hub 24 with the video laryngoscope 12. The method 80 initiates with the wireless hub 24 receiving a user input to power on the wireless hub 24 (block 82). Powering on the wireless hub 24 can automatically activate the transceiver 72 of the wireless hub 24 to start transmitting an optical signal, e.g., an infrared signal (block 84). Additionally or alternatively, the transceiver 72 can be responsive to user input to activate.

If the optical signal is received by an optical detector of an available and in-range video laryngoscope 12, the video laryngoscope 12 activates wireless communication circuitry to send a wireless signal that is received by the wireless hub 24 within a timeout period to wirelessly pair the video laryngoscope 12 and the wireless hub 24 (block 86). Thus, a first level of pairing security and accuracy requires that the video laryngoscope 12 and the wireless hub 24 be located in the same medical environment to maintain at least a temporary optical pathway between them to initiate wireless pairing. In an embodiment, the optical signal is an infrared signal that does not pass through walls and can also not be seen by the human eye. The transmitted infrared signal is not received by video laryngoscopes 12 in adjacent rooms, and undesired pairings with video laryngoscopes 12 outside of the medical environment are not initiated.

Wireless pairing information can be preprogrammed into the video laryngoscope 12 and/or the wireless hub 24 such that the received optical signal activates preprogrammed communication pathways of the video laryngoscope 12 to detect and pair with an available wireless hub 24. The video laryngoscope 12 and/or the wireless hub 24 may also be programmed with wireless pairing information that includes security features to facilitate desired pairings and to avoid pairing attempts with mobile devices or other wireless devise in the medical environment. The wireless pairing information can include a unique key or identification information for a particular wireless hub 24. In an embodiment, the optical transmission from the transceiver 72 includes wireless pairing information for the wireless hub 24. Once received by the video laryngoscope 12, the video laryngoscope 12 can transmit over a wireless (WiFi, Bluetooth) network using the wireless pairing information that, when received by the wireless hub 24, permits wireless pairing between the devices.

Once wirelessly paired to the video laryngoscope, the wireless hub 24 deactivates the transceiver 72 (block 90). While the video laryngoscope 12 can be paired to multiple wireless hubs 24, each wireless hub 24 may, in an embodiment, be paired to only one video laryngoscope 12. Thus, once paired to an individual video laryngoscope 12, the transceiver 72 is deactivated to prevent additional pairing attempts from other video laryngoscopes 12 and to preserve battery life while paired.

The transceiver 72 may remain active through the timeout period until successful wireless pairing is achieved or until the timeout period expires. For example, when the transceiver 72 is active, the wireless hub 24 can activate a timeout period in which to receive a wireless communication from a video laryngoscope 12 in response to a detected optical signal and to successfully wirelessly pair with the video laryngoscope 12. When the timeout period expires with no pairing with a video laryngoscope 12 (block 92), the transceiver 72 is automatically deactivated at the end of the timeout period to preserve battery life of the wireless hub 24 (block 94). For example, the timeout period may expire with no received wireless communication at the wireless hub 24 if there are no in-range video laryngoscopes 12. In other examples, there may be video laryngoscopes 12 in range, but without available pairing slots (discussed with additional detail in FIG. 5). In such cases, the unavailable video laryngoscopes 12 may not respond (i.e., initiate wireless communication) when the optical signal is received or may initiate wireless communication that fails to successfully pair the wireless hub 24 and video laryngoscope 12.

If a pairing attempt between the wireless hub 24 and the video laryngoscope 12 is unsuccessful, the transceiver 72 can be reactivated to try again by user input or by powering the wireless hub 24 off and on again. In other embodiments, the transceiver 72 remains active until wireless pairing of the wireless hub 24 or powering off of the wireless hub 24.

Figure 5:
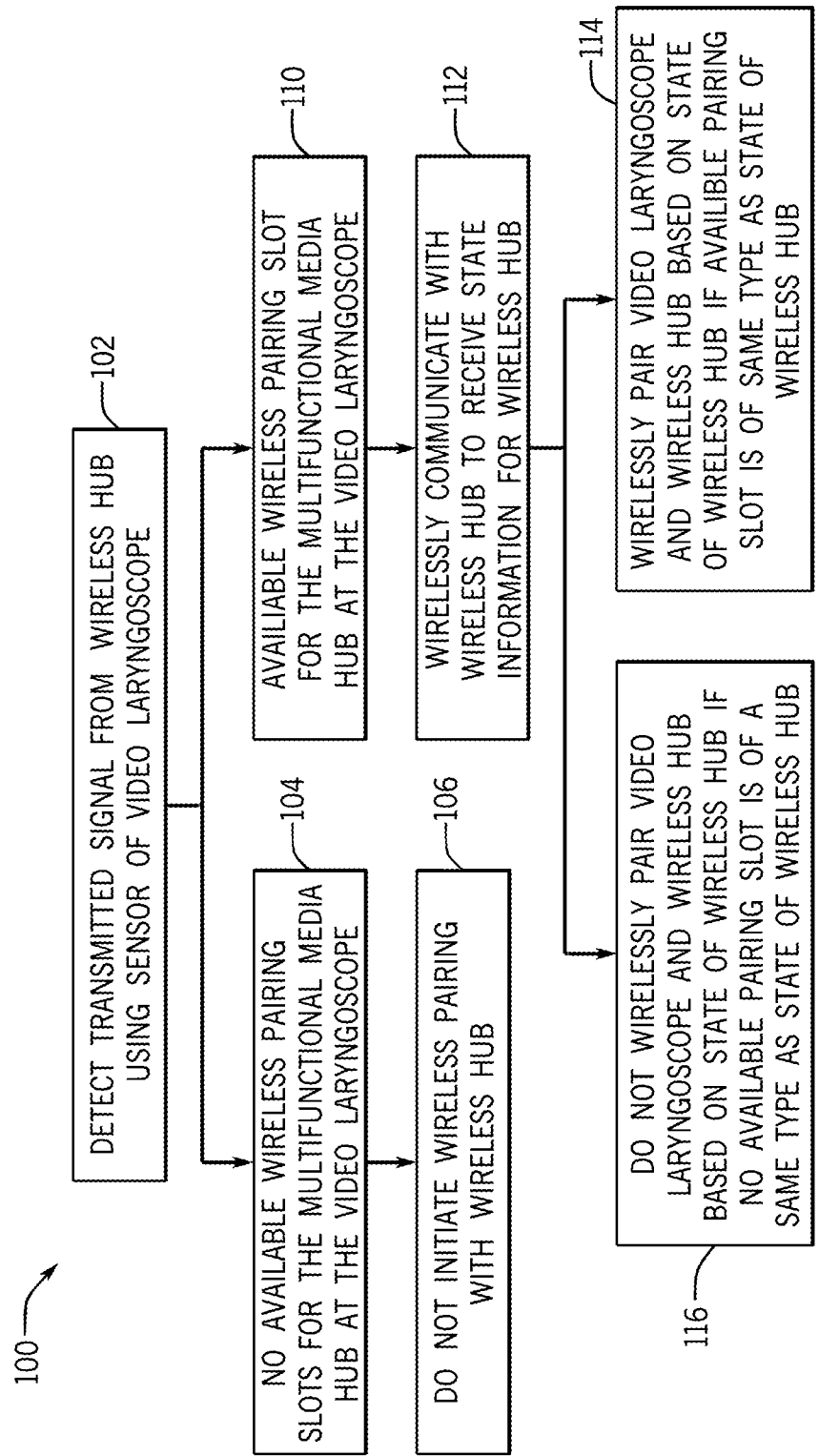
FIG. 5 is a flow diagram of a method of pairing a wireless hub with a video laryngoscope based on a state of the wireless hub, in accordance with an embodiment of the present disclosure.

FIG. 5 is a process flow diagram of a method 100 of pairing a wireless hub 24 with a video laryngoscope 12 of the system 10 and with reference to features discussed in FIGS. 1-3, in accordance with an embodiment of the present disclosure. Successful pairing of the wireless hub 24 with the video laryngoscope 12 may be based on the presence of an in-range video laryngoscope 12 as well as available pairing slots for the in-range video laryngoscope 12. That is, a video laryngoscope 12 may be in range of the wireless hub 24 but nonetheless be unavailable for pairing if no pairing slots are available.

The method 100 initiates with an in-range video laryngoscope 12 detecting via an optical detector, e.g., an infrared detector, an optical signal transmitted by the wireless hub 24 (block 102). In an embodiment, the video laryngoscope 12 can already be paired to one or more other wireless hubs 24 before pairing to a new wireless hub 24. Depending on the programmed pairing limits, the video laryngoscope 12 can have all available pairing slots taken by already-paired wireless hubs 24 (block 104). In such an example, no wireless pairing is initiated (block 106) by the video laryngoscope 12, and, from the perspective of the wireless hub 24, the wireless pairing fails.

However, if at least one pairing slot is available (block 110), the video laryngoscope 12 wirelessly communicates with the wireless hub 24 to receive state information of the wireless hub 24 (block 112) to determine if the state of the wireless hub 24 corresponds to an available pairing slot. If the state of the wireless hub 24 corresponds to an available pairing slot, the wireless hub 24 and the video laryngoscope 12 can wirelessly pair (block 114). If no available pairing slot of the video laryngoscope 12 corresponds to the state of the wireless hub 24, the wireless hub 24 and the video laryngoscope 12 do not wirelessly pair (block 116). The state information for the wireless hub 24 is based on connections to other devices, or a lack of such connections, and can be detected at wireless hub 24 and communicated by the wireless hub 24 to the video laryngoscope 12 as part of a wireless handshake. As discussed herein, the number of available pairing slots can be set at the video laryngoscope 12 and may be based on power requirements for pairing. Data streaming is more power intensive than data transfer, and, therefore, data streaming pairing slots can be more limited than data transfer pairing slots. Accordingly, the video laryngoscope 12 can have multiple pairing slots for wireless hubs 24 in a data transfer state. Even if the video laryngoscope 12 is already paired to a wireless hub 24 that is in a data transfer state, a pairing attempt from a different wireless hub 24 also in a data transfer state can lead to successful wireless pairing if there is at least one additional data transfer pairing slot available at the video laryngoscope 12.

Figure 6:
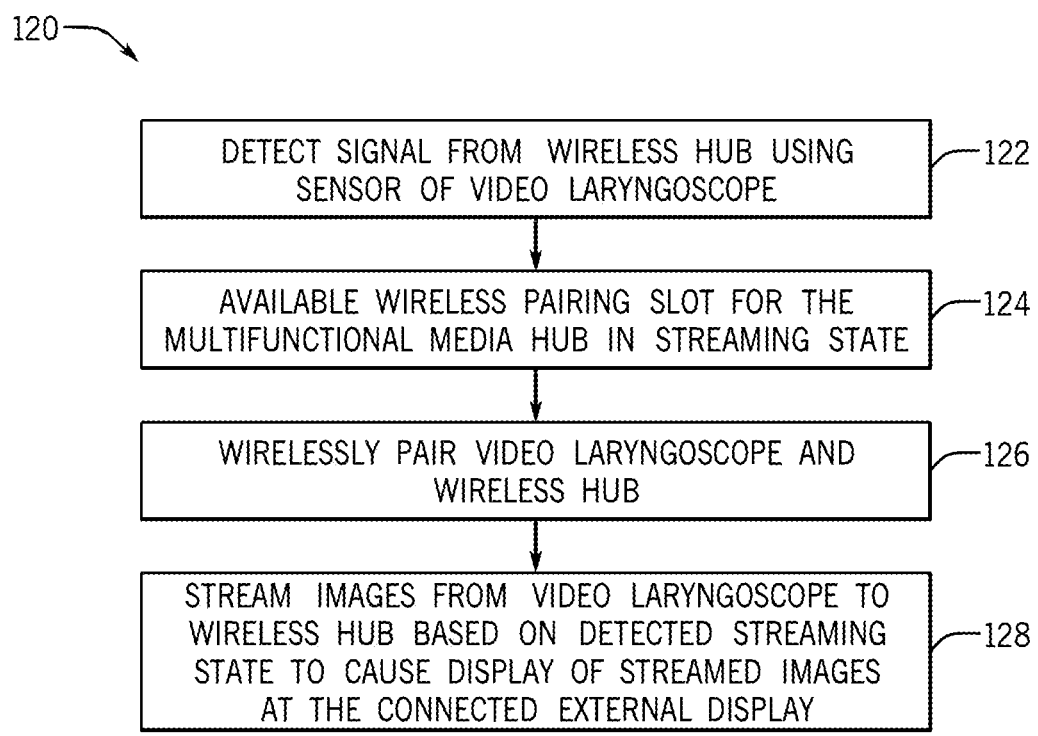
FIG. 6 is a flow diagram of a method of using a wireless hub paired with a video laryngoscope to stream images to an external display, in accordance with an embodiment of the present disclosure.

FIG. 6 is a process flow diagram of a method 120 of pairing a video laryngoscope 12 to a wireless hub 24 that is in a streaming state and with reference to features discussed in FIGS. 1-3, in accordance with an embodiment of the present disclosure. The method 120 initiates at detection of an optical signal by the video laryngoscope that is indicative of a pairing attempt from the wireless hub 24 (block 122). The video laryngoscope 12 wirelessly communicates with the wireless hub 24 to receive information that the wireless hub 24 is in a streaming state based on a wired connection to the external display 33. If the video laryngoscope 12 has an available streaming pairing slot (block 124), then the pairing attempt from the wireless hub 24 in the streaming state can be completed to wirelessly pair the video laryngoscope 12 to the wireless hub 24 (block 128). If the video laryngoscope 12 is already paired to one or more wireless hubs 24 in the streaming state and has no available pairing slots, the wireless pairing attempt is discontinued by the video laryngoscope 12. Once paired, the video laryngoscope can cause the wireless hub 24 to operate in a streaming operating mode by wirelessly streaming images in real time to the wireless hub 24 that are displayed on the external display 33.

Figure 7:
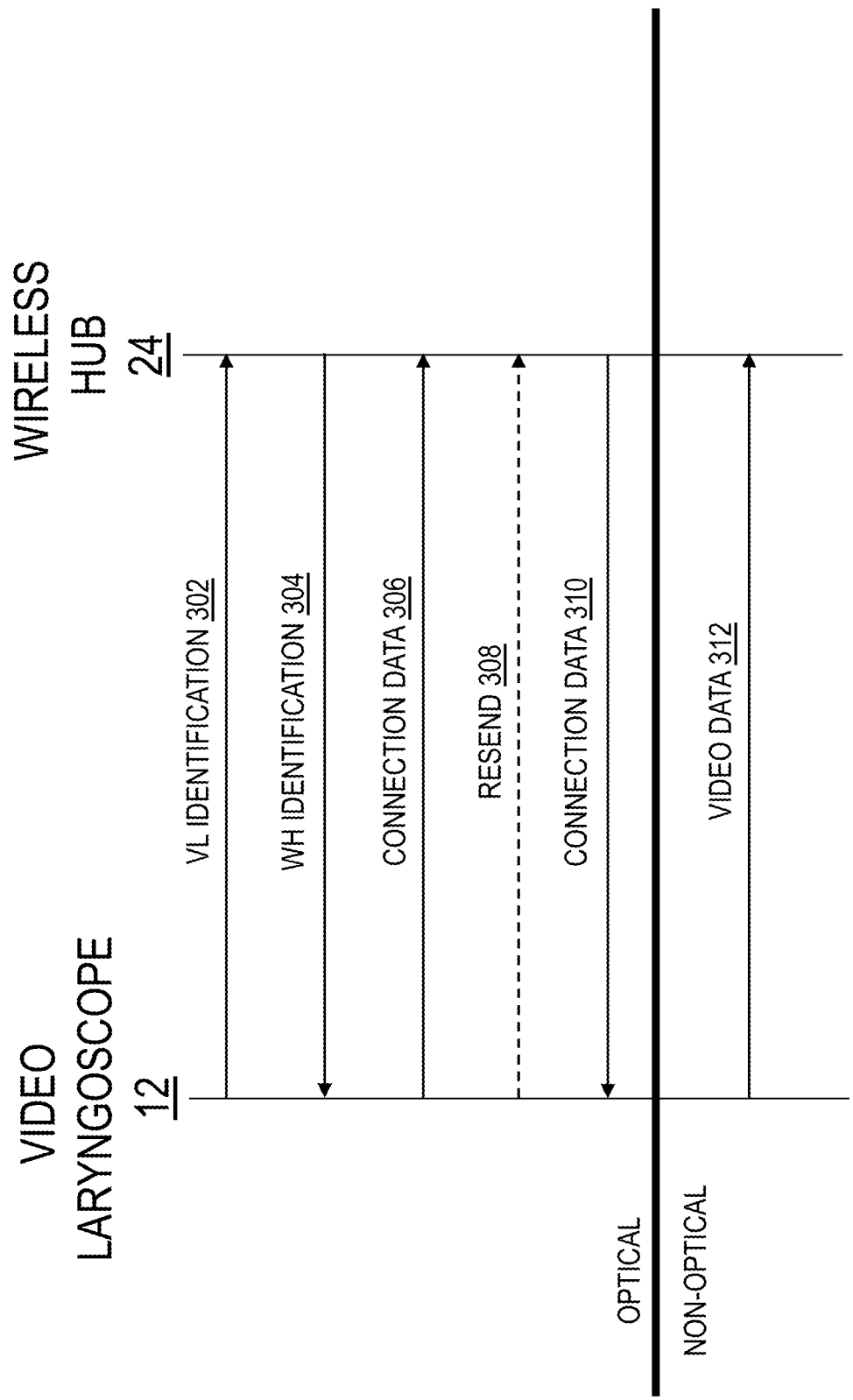
FIG. 7 is a communication diagram illustrating pairing communications between a video laryngoscope and a wireless hub, in accordance with an embodiment of the disclosure.

FIG. 7 is a communication diagram illustrating pairing communications between a video laryngoscope 12 and a wireless hub 24, in accordance with an embodiment of the disclosure. In the example depicted, when the video laryngoscope 12 is powered on, the video laryngoscope 12 may automatically emit an optical signal with video laryngoscope 12 identification data 302. The video laryngoscope 12 identification data 302 identifies the video laryngoscope 12 and may indicate to the wireless hub that an active video laryngoscope 12 is present within the room. The wireless hub 24 emits an optical signal with wireless hub identification data 304. The emission of the wireless hub identification data 304 may be triggered by the receipt of the video laryngoscope 12 identification data 302. In other examples, the wireless hub 24 may emit the wireless hub identification data 304 automatically when the wireless hub is powered on other otherwise activated, as discussed further herein.

The video laryngoscope 12 then emits an optical signal with connection data 306 for facilitating communication in a non-optical band, such as pairing data for establishing a non-optical pairing or communication session. In an example where the non-optical band is WiFi-based, the communication data 306 may include a Service Set Identifier (SSID) and pre-shared key (PSK) data for a wireless (e.g., WiFi) network. In combination with sending the connection data 306, the video laryngoscope 12 may also open or begin opening a wireless access point that corresponds to the connection data (e.g., an access point with the SSID and accessible with the PSK). The emission of the connection data 306 may be triggered based on the receipt of the wireless hub identification data 304.

In some examples, the video laryngoscope 12 may resend the connection data 306, such as when a response is not received from the wireless hub 24 within a set duration. For instance, an optical signal may be emitted with resent connection data 308. The connection data 306 may be resent a set number of times, such as two or three times.

When the connection data 304 is received by the wireless hub 24, the wireless hub 24 sends the connection data back to the video laryngoscope. For instance, the wireless hub emits an optical signal with the reflected or returned connection data 310. The returned connection data 310 serves as a check that the wireless hub 24 did in fact receive the connection data 306 and that the wireless hub 24 is configured to process the data that is optically transmitted from the video laryngoscope 12. The returned connection data 310 may also include additional authentication data for the wireless hub 24 where such information is not already included in the wireless hub identification data 304. When the video laryngoscope 12 receives the returned connection data 310, the video laryngoscope 12 may perform authentication operations to verify or authenticate the identity of the wireless hub 24.

Once the returned connection data 310 is received (and authentication is performed), the non-optical wireless communication is established based on the connection data 310. For example, where the wireless connection is WiFi based, the access point may be established and the wireless hub 24 and the video laryngoscope 12 communicate wirelessly via the access point. Once the non-optical communication is established, the wireless hub 24 may stop emitting optical signals and ignores new or subsequent optical signals.

Image or video data may then be transmitted from the video laryngoscope 12 to the wireless hub via the non-optical communication connection. As discussed further herein, transmission of image data may include streaming image or video data. The transmission of image data may also include the transmission of a recording (e.g., a completed video file) from the video laryngoscope 12 to the wireless hub 24. In some examples, data may also be sent from the wireless hub 24 to the video laryngoscope 12 via the non-optical communication connection. For instance, the wireless hub 24 may communication changes in the non-optical connection, such as which port the wireless hub 24 is connected.

Once the video laryngoscope 12 is connected to the wireless hub 24, the communication protocol identified in FIG. 7 may then repeat for connections to additional or subsequent wireless hubs. Accordingly, serial connections may be formed between the video laryngoscope 12 and additional wireless hubs. In examples where WiFi communication is used, the access point will already have been opened by the video laryngoscope 12 when the connection to the first wireless hub 24 is established. Thus, for subsequent connections to additional wireless hubs, the same access point may be used, and additional Internet Protocol (IP) addresses may be used for the subsequent connections to additional wireless hubs.

Figure 8:
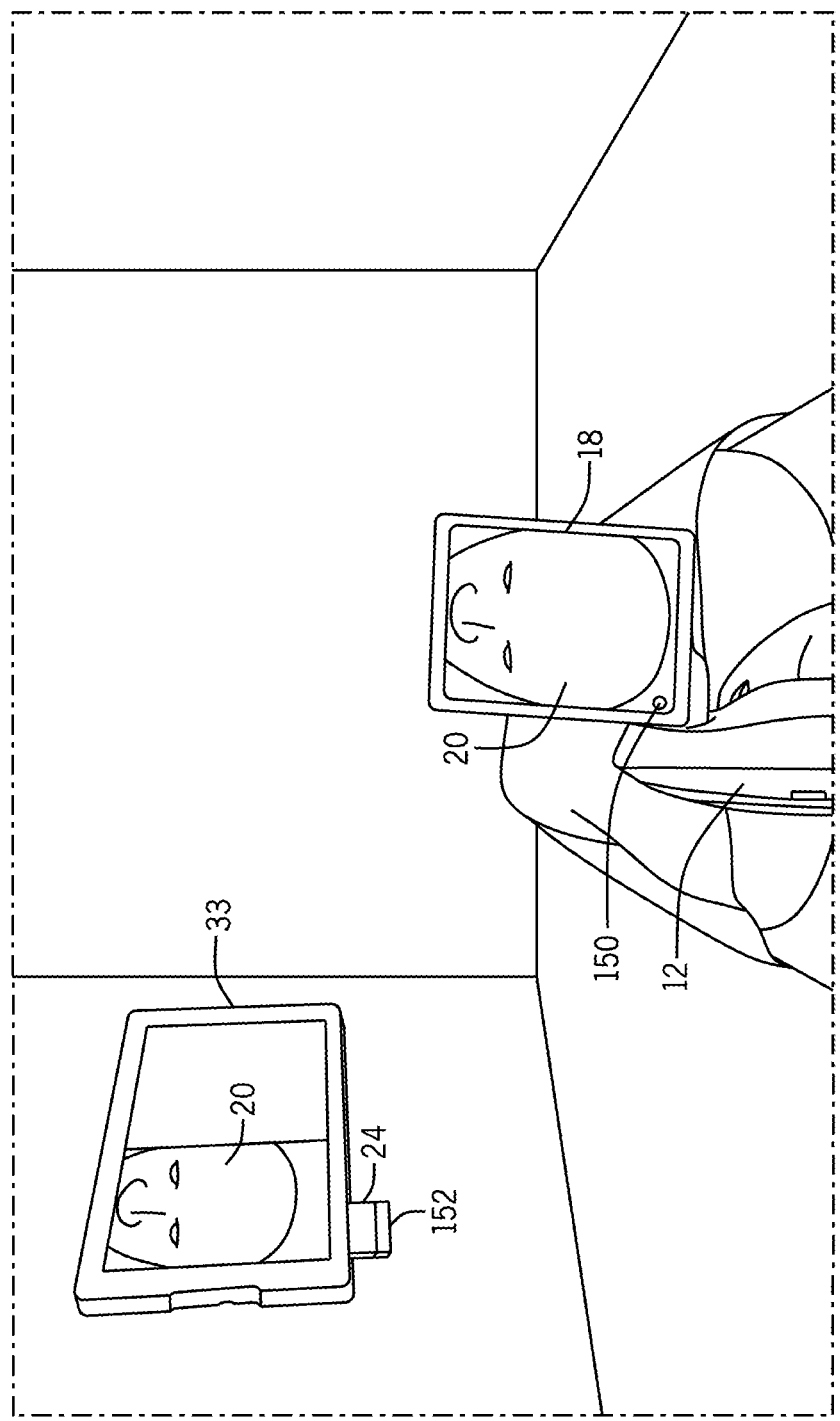
FIG. 8 is a schematic illustration of a patient environment including a wireless hub paired with a video laryngoscope to stream images to an external display, in accordance with an embodiment of the present disclosure.

FIG. 8 is a schematic illustration of a wirelessly paired video laryngoscope 12 and wireless hub 24 in a streaming operating mode. As illustrated, the images 20 captured by the video laryngoscope 12 are displayed on both the display screen 18 of the video laryngoscope 12 and the external display 33 simultaneously. In the illustrated embodiment, the wireless hub 24 is inserted into a slot of the external display 33. However, the wireless hub 24 may also be coupled by cables to the external display 33. For example, the streaming state of the wireless hub 24 can be based on having an image transfer connection (e.g., via a first connection port 74) and a power connection (e.g., via a second connection port 76) between the wireless hub 24 and the external display 33. The streaming operating mode can be indicated by the video laryngoscope 12 and/or wireless hub 24. In the illustrated example, a graphical indicator 150 wireless hub is displayed on the display screen 18 to indicate that the video laryngoscope is actively paired with a hub 24, and an indicator light 152 on the wireless hub 24 is active during streaming. However, additional or other indicators are also contemplated on the video laryngoscope 12 and/or wireless hub 24, including haptic, audio, and visible indicators.

Disconnection of the wireless hub 24 from the external display 33 (e.g., via disconnection of cables at the connection ports 74, 76) can automatically update the state of the wireless hub 24 from the streaming state to a data transfer state. Upon a change of state, the wireless hub 24 can wirelessly communicate the change to the video laryngoscope 12. The video laryngoscope 12 can in turn stop streaming images 20 to the wireless hub 24 based on the change in state while keeping the wireless hub 24 wirelessly paired. After the change in state, the wireless hub 24 will operate in a data transfer operating mode to receive recorded images, as generally discussed with reference to FIG. 9.

Further, the wireless hub 24 can also revert to a streaming state upon reconnection to the external display 33.

Figure 9:
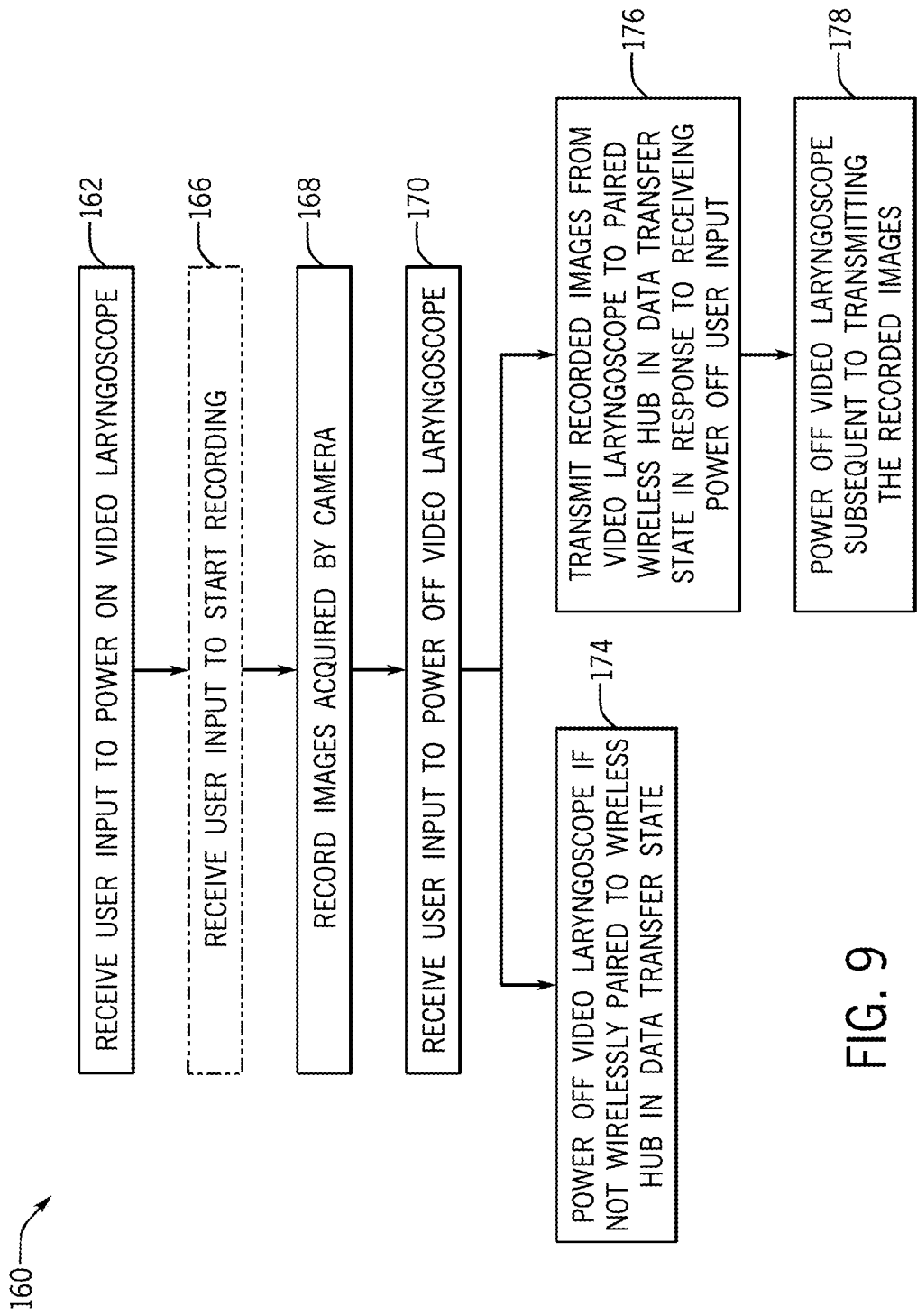
FIG. 9 is a flow diagram of a method of recording images using a video laryngoscope and transferring the recorded images to a paired wireless hub, in accordance with an embodiment of the present disclosure.

FIG. 9 is a process flow diagram of a method 160 of using a video laryngoscope 12 to record and transfer acquired images and with reference to features discussed in FIGS. 1-3, in accordance with an embodiment of the present disclosure. The method 160 initiates when the video laryngoscope 12 is powered on via a user input (block 162). The video laryngoscope 12 may receive a user input to start recording (166) and, in response, records acquired images 20 to a memory of the video laryngoscope (block 168). In other embodiment, the video laryngoscope 12 may operate to automatically record all acquired images by default. When the operator (e.g., the operator 13) is done using the video laryngoscope 12, the operator provides a power off user input that is received by the video laryngoscope 12 (block 170).

If the video laryngoscope 12 is not wirelessly paired to any wireless hub 24 operating in a data transfer operating mode at the time the power off user input is received, the method 160 powers off the video laryngoscope 12 (block 174). However, if at the time the power off user input is received, the video laryngoscope 12 is wirelessly paired to any wireless hub 24 in a data transfer state, the power off action is delayed. Before the video laryngoscope 12 is powered off, the video laryngoscope 12 performs a data transfer operation to transfer the recorded images to any paired wireless hub 24 in the data transfer state (block 176). The video laryngoscope is powered off subsequent to transmitting the recorded images (block 178). Batch transferring recorded images before powering off the video laryngoscope 12 preserves laryngoscope power until the medical procedure is complete. In an embodiment, the images transfer to the paired wireless hub 24 automatically in response to the power off user input, with no further user input required to initiate data transfer. Thus, having a pairing between a data transfer wireless hub 24 and the video laryngoscope 12, at the time of power off of the video laryngoscope 12, facilitates automatic data transfer of images. Automatic transfer of the images provides the benefit of reducing user inputs and device manipulation during a medical procedure.

In one example, the wireless hub 24 can be powered off during most or all of a procedure while the video laryngoscope 12 is actively acquiring images. However, so long as the wireless hub 24 is powered on and paired with the video laryngoscope 12 at any point before the video laryngoscope 12 is powered off, a data transfer of the entire set of acquired images can occur. That is, the video laryngoscope 12 acquires images from a procedure, and sends all of the images acquired after being turned on to the paired wireless hub 24 in data transfer mode. The wireless hub 24 can receive and store files that were acquired by video laryngoscope 12 before the wireless hub 24 was turned on and/or paired.

Figure 10:
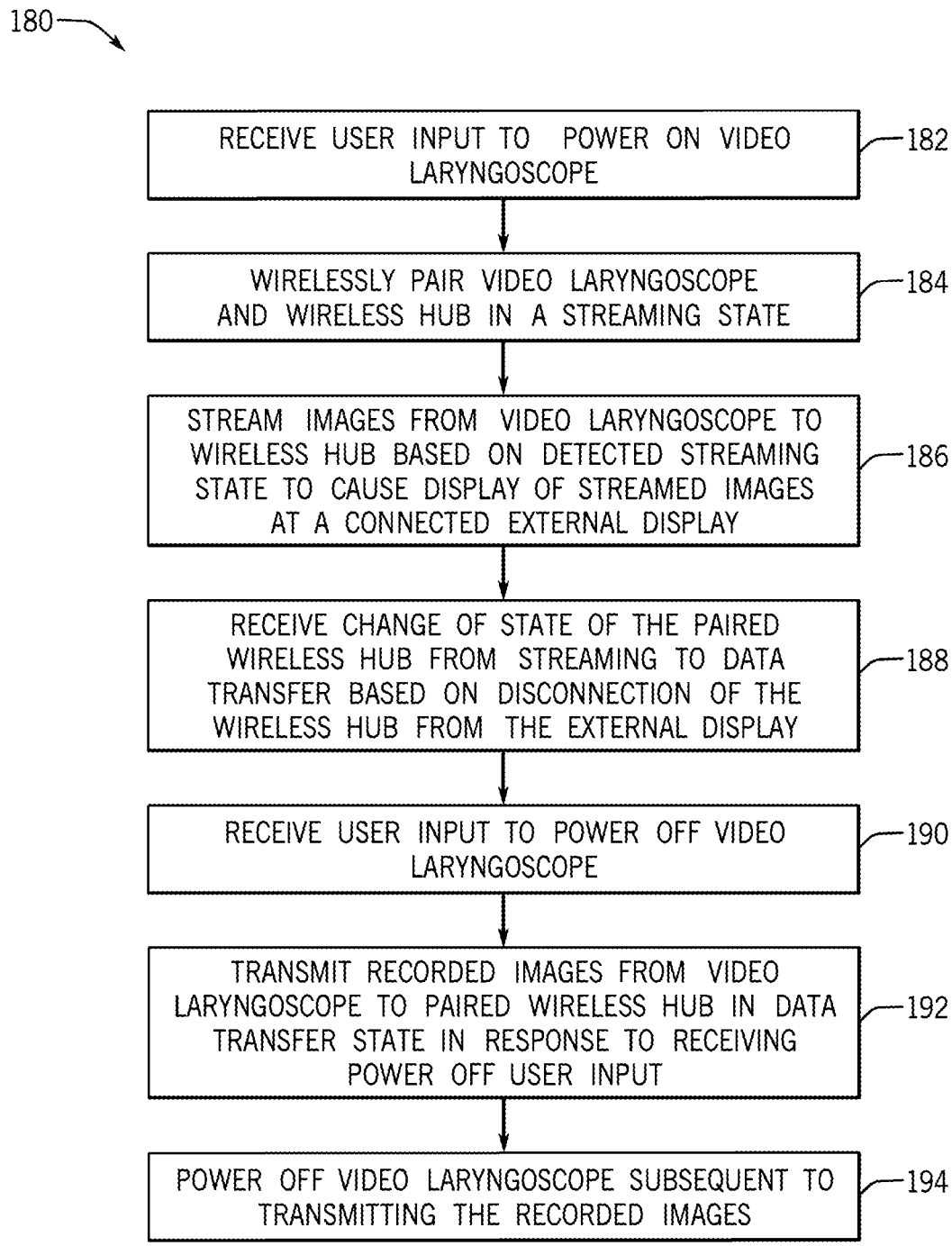
FIG. 10 is a flow diagram of a method of pairing between a video laryngoscope a wireless hub that changes state during the pairing, in accordance with an embodiment of the present disclosure.

FIG. 10 is a process flow diagram of a method 180 that shows a change in state, and corresponding operating mode, over the course of a pairing session of the wireless hub 24 with a video laryngoscope 12 and with reference to features discussed in FIGS. 1-3, in accordance with an embodiment of the present disclosure. The method 180 initiates when the video laryngoscope 12 is powered on via a user input (block 182). In the method 180, the video laryngoscope 12 and wireless hub 24 are wirelessly paired, and the wireless hub 24 is in a data streaming state as generally disclosed herein when paired. For example, a processor of the wireless hub 24 can select parameters or information associated with a data streaming operating mode based on the detected external display coupling and communicate the data streaming operating mode information to the video laryngoscope 12. Thus, the acquired images from the video laryngoscope are automatically streamed to the wireless hub 24, and the streamed images are displayed at the external display 33 that is connected to the wireless hub (block 186).

Disconnection of the wireless hub 24 from the external display 33 causes an update of the state of the wireless hub 24 from a streaming state to a data transfer state, and the change of state is communicated to the video laryngoscope 12 (block 188). The video laryngoscope 12, in turn, receives the change in state and causes the wireless hub 24 to operate in the data transfer mode. In one example, a processor of the wireless hub 24 can select parameters or information associated with a data transfer operating mode based on the change in state and communicate the data transfer operating mode information to the video laryngoscope 12. Thus, during the wireless pairing, the wireless hub 24 initially operates in the streaming operating mode and then switches to the data transfer operating mode. If the wireless hub 24 is operating in the data transfer operating mode at a time the power off user input is received (block 190), the power off action is delayed. Before the video laryngoscope 12 is powered off, the video laryngoscope 12 performs a data transfer operation to transfer the recorded images to any paired wireless hub 24 in the data transfer state (block 192). The video laryngoscope is powered off subsequent to transmitting the recorded images (block 194). Pairing between the video laryngoscope 12 and any paired wireless hubs 24 in streaming and/or data transfer operating mode is interrupted by powering off the video laryngoscope 12.

Figure 11:
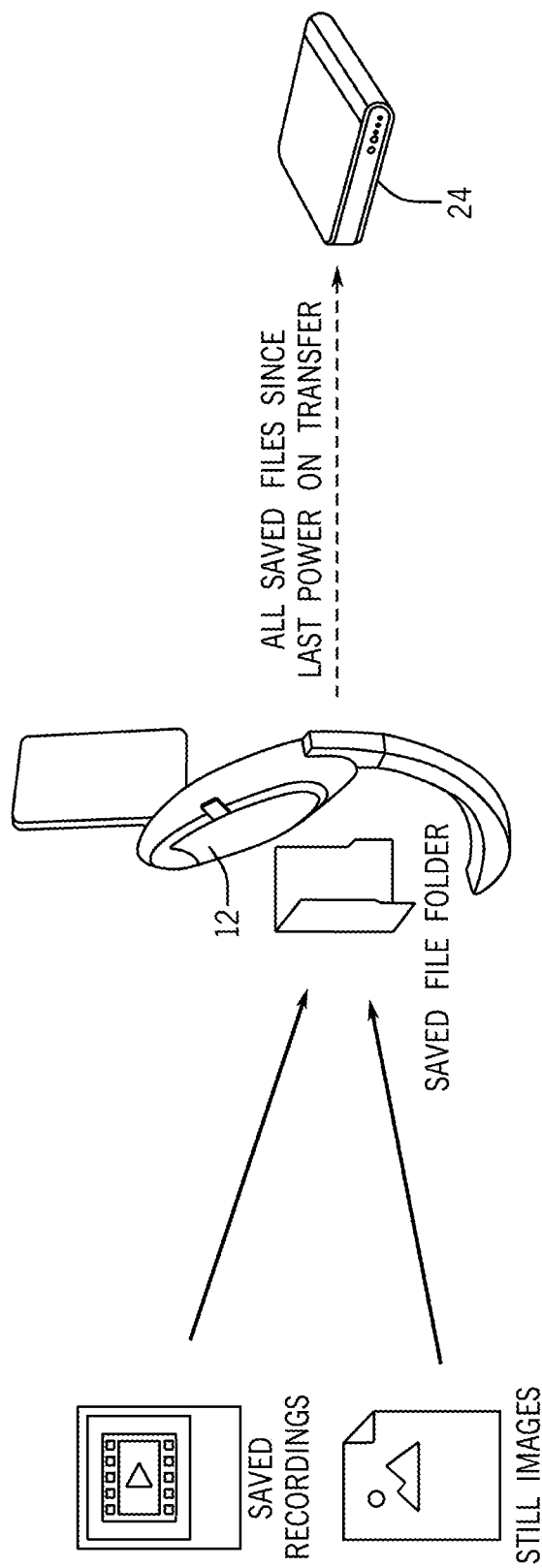
FIG. 11 is a schematic illustration of data transfer of recorded video and captured still images from a video laryngoscope to a wireless hub, in accordance with an embodiment of the present disclosure.

FIG. 11 is a schematic illustration of batch transfer of recorded images to the wireless hub 24. The transferred files can include recorded video images and still images. The video laryngoscope 12 may have retained stored files from previous procedures. However, the data transfer operating mode of the system 10 transfers files to the wirelessly paired wireless hub 24 that are recorded subsequent to the most-recent power-on. As provided herein, the data transfer may involve transmitting a copy of the images files to the paired wireless hub 24 such that the original file or files are retained on the video laryngoscope 12.

Figure 12:
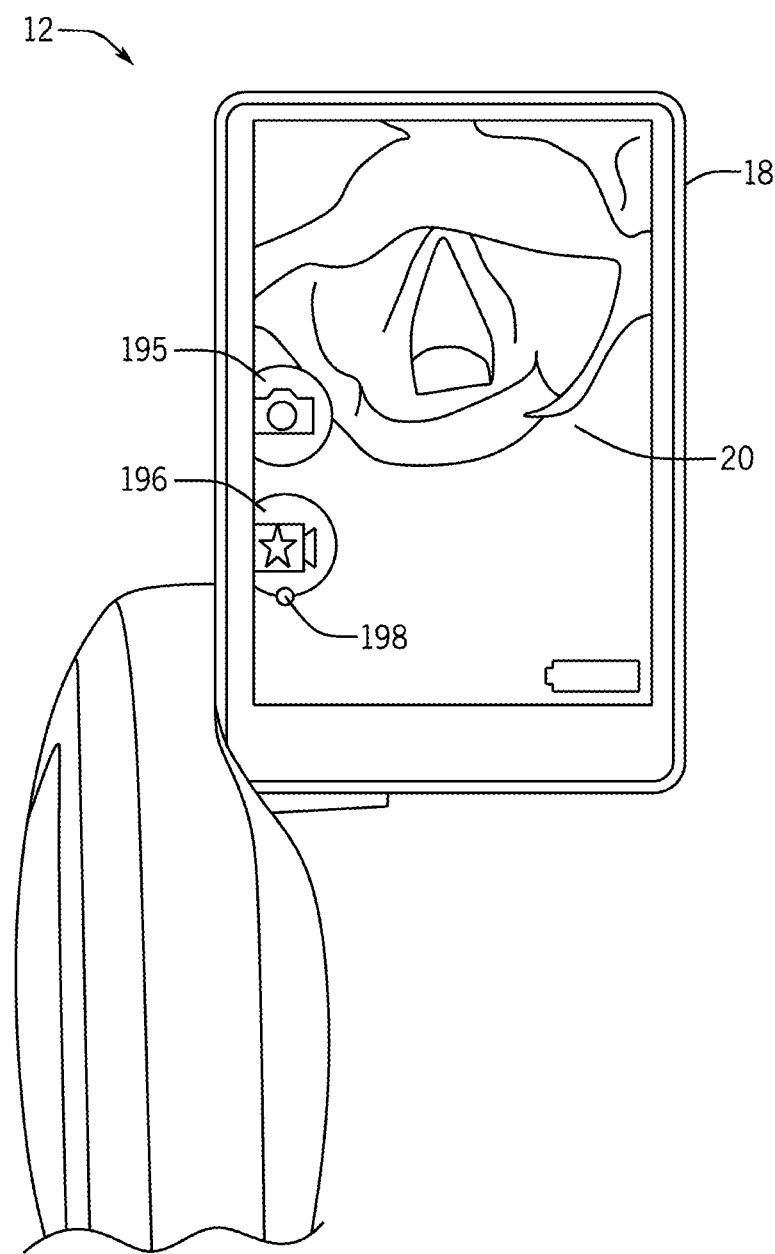
FIG. 12 is an example video laryngoscope display screen showing example user inputs to record video and capture still images, in accordance with an embodiment of the present disclosure.

FIG. 12 shows an example display screen 18 of the video laryngoscope 12 including graphical image capture indicators over acquired images 20. A still image capture indicator 195, when activated by user input, causes the video laryngoscope 12 to record the still image on the display screen 18. A video capture indicator 196, when activated by user input, causes the video laryngoscope 12 to record video. A moving indicator 198 can rotate or otherwise execute an animation on the display screen 18 to indicate that video recording is active or ongoing.

Figure 13:
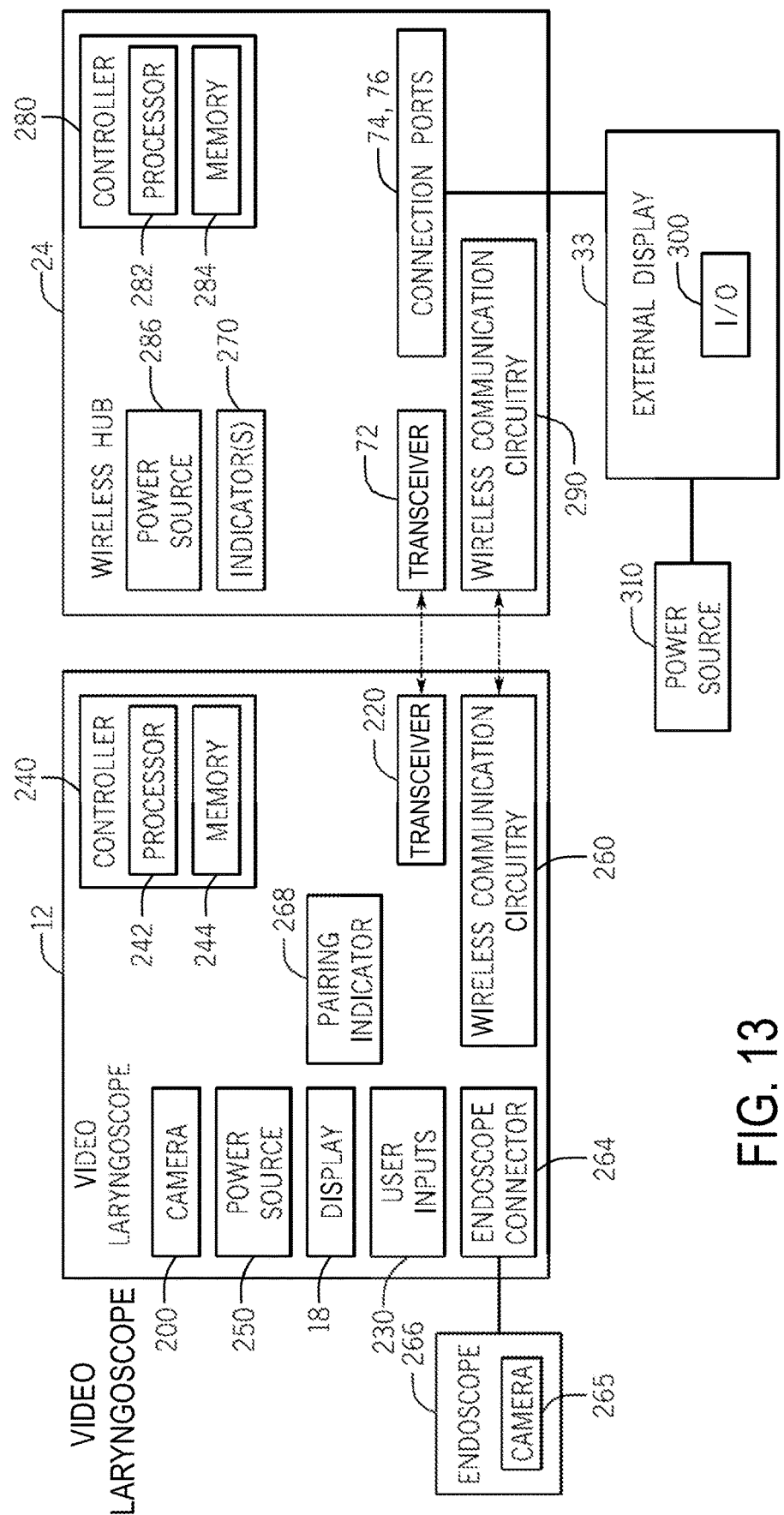
FIG. 13 is a block diagram of components of a video laryngoscope wireless hub system, in accordance with an embodiment of the present disclosure.

FIG. 13 is a block diagram of an embodiment of the video laryngoscope system 10. As shown, the system 10 includes the video laryngoscope 12 and at least one wireless hub 24. The video laryngoscope 12 and the wireless hub 24 may include various components that enable the system 10 to perform the techniques disclosed herein. For example, the video laryngoscope 12 may include the display screen 18, a camera 200, an optical transceiver 220 (such as an infrared detector and/or transmitter), and user inputs (e.g., touch sensor, power button) 230, as well as a controller 240 (e.g., electronic controller), one or more processors 242, a hardware memory 244, a power source (e.g., battery) 250, and a communication device 260, and, in embodiments, a connector 264 to an endoscope 266. The video laryngoscope 12 can receive images from the camera 265 of the endoscope 266.

As discussed herein, the images 20 may be images from the laryngoscope camera 200, the endoscope camera 265, or both. The video laryngoscope 12 can provide indicators via the display 18 as well as other indicators 268 (haptic, audio, and/or visual indicators) of wireless pairing.

The wireless hub 24 may include the transceiver 72, one or more indicators 270 (e.g., the notification bar 60, haptic, audio, and/or visual indicators), a controller 280 (e.g., electronic controller), one or more processors 282, a hardware memory 284, a power source (e.g., battery) 286, and a communication device 290. The power sources 250, 286 may be rechargeable and/or replaceable batteries. In embodiments, the wireless hub 24 is headless, meaning that it operates without a dedicated or integrated display and/or user interface.

The system 10 can include an external display 33 an input/output ports 300 to which the wireless hub 24 can be coupled. A power source 310 of the external display 33 can provide power to the wireless hub 24 when coupled such that the streaming operating mode is powered by the external display 33.

The communication devices 260, 290 may be wireless transceivers that are configured to establish wireless communication with one another. By way of example, the communication devices may be configured to communicate using the IEEE 802.15.4 standard, and may communicate, for example, using ZigBee, WirelessHART, or MiWi protocols. Additionally or alternatively, the communication devices may be configured to communicate using the Bluetooth standard or one or more of the IEEE 802.11 standards. streaming operating mode or data transfer operating mode.

The hardware memory 244, 284 may include a volatile memory, such as random access memory (RAM), and/or a nonvolatile memory, such as read-only memory (ROM). For example, the memory 244, 284 may store processor-executable instructions (e.g., firmware or software) for the processors 242, 282 to execute. The hardware memory 244, 284 may store images 20 and instructions (e.g., software or firmware for storing the images, transmitting the images, etc.), and any other suitable data. The processor 242 of the video laryngoscope 12 may be configured to receive state information from the wireless hub 24 and perform actions consistent with the received state information to cause the wireless hub 24 to operate in an appropriate operating mode.

Figure 14:
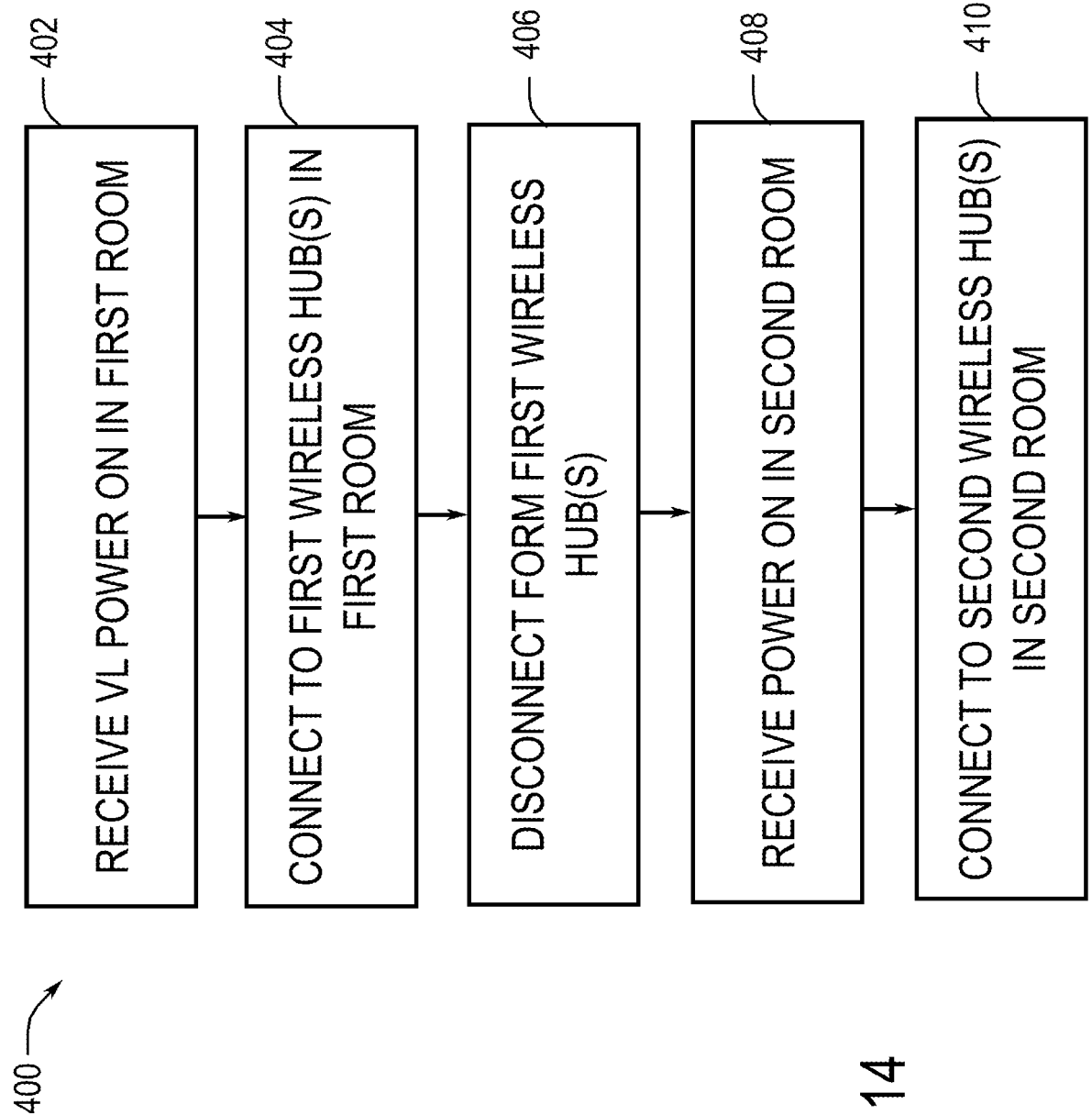
FIG. 14 is a flow diagram of a method of wireless connecting a video laryngoscope to multiple wireless hubs in different rooms, according to an embodiment of the present disclosure.

FIG. 14 is a flow diagram of a method 400 of wireless connecting a video laryngoscope to multiple wireless hubs in different rooms, according to an embodiment of the present disclosure. An input to power on a video laryngoscope is received (block 402) while the video laryngoscope is in a first room. Based on receiving the power-on input, the video laryngoscope 12 executes an algorithm or protocol to automatically establish (block 404) a wireless connection with one or more first wireless hubs in the first room. As an example, the video laryngoscope 12 may execute the methods and operations described herein, such as by performing the communication protocol set forth in FIG. 7. For instance, the video laryngoscope 12 may first communicate over an optical band with the one or more wireless hubs to then establish a non-optical wireless connection between the video laryngoscope 12 and one or more first wireless hubs.

During, or after, the medical procedure performed with the video laryngoscope 12, the video or image data is transmitted from the video laryngoscope 12 to the one or more first wireless hubs, as discussed herein. The connection between then ceased or disconnected (block 406). Ceasing the connection may be in response to a power off input on the video laryngoscope 12 and/or other input received at the video laryngoscope 12 to cease the connection. Ceasing the connection in some examples may include deleting the identification data of the first wireless hubs that was used in forming the first connections within the first wireless hub(s).

Subsequent to disconnection of the video laryngoscope 12 and the first wireless hub(s), the video laryngoscope 12 is moved to a second operating room that may be adjacent to the first operating room. When in the second operating room, an input to power on the video laryngoscope 12 is received (block 408). Based on receiving the power-on input, video laryngoscope 12 executes the algorithm or protocol to automatically establish (block 410) a wireless connection with one or more second wireless hubs in the second room. For instance, the video laryngoscope 12 may first communicate over an optical band with the one or more wireless hubs to then establish a non-optical wireless connection between the video laryngoscope 12 and one or more second wireless hubs.

Unlike other pairing protocols that may restore automatically prior connections (e.g., some Bluetooth it WiFi protocols) when the devices are brought in proximity to one another, the present technology may prevent such restoration of previous connections to avoid connecting to a wireless hub in a different room. For example, the automated connection of the present technology initiates optical communication even to connect to a wireless hub to which the video laryngoscope 12 had been previously connected. Even though optical portion of the connection protocol is performed each time the video laryngoscope 12 is powered on, the automatic establishment still may occur with a single press of the power button, which results in a one-touch connection between the video laryngoscope 12 and the wireless hubs without any additional interaction required from the medical professional. In some examples, recording of the acquired images may also automatically being upon powering the. As such, the single press or touch of the power button may result in automatic connection to wireless hubs along with video recording and/or streaming without additional interaction with the medical professional.

The methods discussed herein include various steps represented by blocks in flow diagrams. It should be noted that at least some steps may be performed as an automated procedure by one or more components of a system, such as the system 10. Although the flow diagrams may illustrates the steps in a certain sequence, it should be understood that the steps may be performed in any suitable order and certain steps may be carried out simultaneously, where appropriate. Additionally, steps may be added to or omitted from of the methods.

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims. Further, it should be understood that certain elements of the disclosed embodiments may be combined or exchanged with one another.

What is claimed is:

1. A video laryngoscope system, comprising:
   a video laryngoscope comprising:
      a camera that acquires images;

an infrared sensor that detects an infrared signal comprising pairing data for pairing with a wireless hub; and a first non-optical wireless transceiver that transmits a wireless communication for pairing in response to the detected infrared signal; and the wireless hub, wherein the wireless hub comprises:

an infrared transmitter and a second non-optical wireless transceiver, wherein the wireless hub operates to:

transmit the infrared signal using the infrared transmitter;

receive, at the second non-optical wireless transceiver, the wireless communication from the video laryngoscope; and wirelessly pair to the video laryngoscope in response to receiving the wireless communication.

2. The video laryngoscope system of claim 1, wherein the wireless hub or the video laryngoscope comprise a visual and/or haptic indicator of the wireless pairing.

3. The video laryngoscope system of claim 1, wherein the wireless hub deactivates the infrared transmitter in response to the wireless pairing.

4. The video laryngoscope system of claim 1, wherein the wireless hub comprises a processor that operates to detect a first state or a second state of the wireless hub and to communicate the detected first state or second state to the video laryngoscope.

5. The video laryngoscope system of claim 4, wherein the first state is a streaming state in which the wireless hub streams images received from the laryngoscope to a display and the second state is a transfer state in which the wireless hub receives images from the laryngoscope and stores the images.

6. The video laryngoscope system of claim 5, wherein the first state is detected based on coupling of the wireless hub to an external display via both a first port and a second port of the wireless hub.

7. The video laryngoscope system of claim 5, wherein the second state is detected based on a lack of connection to an external display.

8. The video laryngoscope system of claim 1, wherein the wireless hub comprises a processor that operates to detect a data transfer state of the wireless hub based on a lack of connection to any other device.

9. The video laryngoscope system of claim 1, comprising a second wireless hub wirelessly paired to the video laryngoscope.

10. The video laryngoscope system of claim 1, wherein the infrared signal comprises wireless pairing information of the wireless hub.

11. A video laryngoscope image recording method, comprising:

based on an infrared signal that includes pairing data and is received from a wireless hub, pairing with the wireless hub via a non-optical wireless communication connection between a first non-optical wireless transceiver of the video laryngoscope and a second non-optical wireless transceiver of the wireless hub;

acquiring an image using a camera of the video laryngoscope;

receiving, at a user interface of the video laryngoscope, a first user input to record the acquired image as a recorded image;

receiving a second user input to power off the video laryngoscope;

without further user input, wirelessly transmitting the recorded image to a wireless hub paired to the video laryngoscope; and subsequently to the transmitting, powering off the video laryngoscope.

12. The method of claim 11, comprising wirelessly pairing the video laryngoscope and a second wireless hub in response while the video laryngoscope is wirelessly paired to the wireless hub.

13. A wireless hub comprising:

a headless housing comprising an external data port;

an optical transmitter carried by the housing;

a non-optical wireless transceiver, separate from the optical transmitter, carried by the housing;

a processor carried by the housing, wherein the processor is programmed to:

receive, via the non-optical wireless transceiver, a pairing signal comprising pairing information for a video laryngoscope within range of the optical transmitter;

wirelessly pair to the video laryngoscope in response to receiving the pairing signal;

detect a connection status of the external data port;

select a first or a second operating mode based on the detected connection status of the external data port;

receive, via the non-optical wireless transceiver, images from the video laryngoscope; and operate in the first operating mode or the second operating mode based on selecting the first operating mode or the second operating mode.

14. The wireless hub of claim 13, wherein the housing comprises a lanyard opening or hook.

15. The wireless hub of claim 13, further comprising a hardware memory carried by the housing, and wherein the images from the video laryngoscope are stored in the memory.

16. The wireless hub of claim 13, wherein the processor is programmed to:

determine a state of the wireless hub based on the connection status of the external data port, wherein the state is a streaming state in which the wireless hub streams images received from the laryngoscope to a display or a transfer state; and communicate the state to the video laryngoscope.

* * * * *